US009120453B2

(12) United States Patent
Obayashi et al.

(10) Patent No.: US 9,120,453 B2
(45) Date of Patent: Sep. 1, 2015

(54) VIBRATION REDUCING STRUCTURE FOR STEERING WHEEL

(71) Applicant: HONDA MOTOR CO., LTD., Tokyo (JP)

(72) Inventors: Yuya Obayashi, Wako (JP); Takeru Fukuda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/360,142

(22) PCT Filed: Nov. 12, 2012

(86) PCT No.: PCT/JP2012/079276
§ 371 (c)(1),
(2) Date: May 22, 2014

(87) PCT Pub. No.: WO2013/077215
PCT Pub. Date: May 30, 2013

(65) Prior Publication Data
US 2014/0306432 A1 Oct. 16, 2014

(30) Foreign Application Priority Data

Nov. 24, 2011 (JP) ................................. 2011-255811

(51) Int. Cl.
*B62D 1/10* (2006.01)
*B60R 21/203* (2006.01)
(Continued)

(52) U.S. Cl.
CPC ........... *B60R 21/203* (2013.01); *B60R 21/2037* (2013.01); *B62D 1/10* (2013.01); *B62D 7/222* (2013.01); *F16F 7/1028* (2013.01)

(58) Field of Classification Search
CPC .. B60R 21/2037; B60R 21/203; B62D 7/222; B62D 1/10; F16F 7/1028
USPC ................. 280/731, 728.2; 200/61.54–61.56; 188/378–380
See application file for complete search history.

(56) References Cited

U.S. PATENT DOCUMENTS 8,286,766 B2 * 10/2012 Terada et al. ................. 188/379
8,567,818 B2 * 10/2013 Umemura et al. ............ 280/731
(Continued)

FOREIGN PATENT DOCUMENTS

JP     2001-233159 A     8/2001
JP     2001-278060 A     10/2001
(Continued)

OTHER PUBLICATIONS

International Search Report dated Jan. 15, 2013 issued in corresponding application No. PCT/JP2012/079276.
(Continued)

*Primary Examiner* — Drew Brown
(74) *Attorney, Agent, or Firm* — Westerman, Hattori, Daniels & Adrian, LLP (57) ABSTRACT

Since an airbag module is supported in an interior of a steering wheel via an elastic body so as to be capable of vibrating, the airbag module vibrates while deforming the elastic body to thus function as a dynamic damper, thereby enabling vibration of the steering wheel to be suppressed. Since the elastic body is formed from a support pin itself, which supports the airbag module on the frame of the steering wheel, compared with a case in which the support pin and the elastic body are formed from separate members, it is possible to reduce the number of components and the number of assembly steps. A part of the support pin may form the elastic body, and the entirety of the support pin may form the elastic body.

6 Claims, 7 Drawing Sheets

(51) Int. Cl.
  *B62D 7/22*  (2006.01)
  *F16F 7/10*  (2006.01)

(56) References Cited

U.S. PATENT DOCUMENTS

| | | | |
|---|---|---|---|
| 8,720,942 B2* | 5/2014 | Onohara | 280/731 |
| 8,794,662 B2* | 8/2014 | Ishii et al. | 280/731 |
| 2002/0140210 A1* | 10/2002 | Lovell et al. | 280/728.2 |
| 2004/0070185 A1* | 4/2004 | Xu | 280/731 |
| 2006/0131850 A1* | 6/2006 | Tsujimoto et al. | 280/731 |
| 2006/0208470 A1 | 9/2006 | Tsujimoto et al. | |
| 2008/0136073 A1* | 6/2008 | Kreuzer | 267/140.11 |
| 2009/0218739 A1 | 9/2009 | Terada et al. | |
| 2013/0076011 A1* | 3/2013 | Umemura et al. | 280/728.2 |
| 2013/0241181 A1* | 9/2013 | Faeth et al. | 280/728.2 |
| 2013/0255435 A1* | 10/2013 | Umemura et al. | 74/552 |

FOREIGN PATENT DOCUMENTS

| | | |
|---|---|---|
| JP | 2006-21576 A | 1/2006 |
| JP | 2007-50876 A | 3/2007 |
| JP | 2009-202859 A | 9/2009 |

OTHER PUBLICATIONS

Japanese Office Action dated Apr. 22, 2015, issued in corresponding JP Patent Application No. 2013-545883 (3 pages).

* cited by examiner

VIBRATION REDUCING STRUCTURE FOR STEERING WHEEL

TECHNICAL FIELD

The present invention relates to a vibration reducing structure for a steering wheel in which an airbag module is supported in an interior of the steering wheel via an elastic body so as to be capable of vibrating, thus making the airbag module function as a dynamic damper.

BACKGROUND ART

An arrangement in which a slider is slidably supported on a guide shaft implanted in a horn bracket of a steering wheel, an airbag module is supported on this slider via a damper spring made of rubber in an annular shape, by moving the airbag module in the axial direction while compressing a coil spring disposed around the guide shaft a contact of a horn is closed, and by vibrating the airbag module orthogonal to the axial direction while deforming the damper spring the airbag module functions as a dynamic damper to thus suppress vibration of the steering wheel is known from Patent Document 1 below.

Furthermore, an arrangement in which a plurality of mounting pieces are projectingly provided on an airbag module, and inserting the mounting pieces through mounting piece insertion holes formed in a base part of a steering wheel and latching them by means of a latching spring enables the airbag module to be fixed to the base part via a one-touch operation is known from Patent Document 2 below.

RELATED ART DOCUMENTS

Patent Documents

Patent Document 1: Japanese Patent Application Laid-open No. 2009-202859
Patent Document 2: Japanese Patent Application Laid-open No. 2007-50876

SUMMARY OF THE INVENTION

Problems to be Solved by the Invention

With regard to the arrangement described in Patent Document 1 above, since the slider is fitted around the outer periphery of the guide shaft, the damper spring is fixed to the outer periphery of the slider, and the bracket of the airbag module is fixed to the outer periphery of the damper spring, not only does the number of components increase, but there is also the problem that the number of assembly steps for these components increases.

Furthermore, with regard to the arrangement described in Patent Document 2 above, although it is easy to mount the airbag module on the steering wheel, there is no structure that allows the airbag module to vibrate and function as a dynamic damper.

The present invention has been accomplished in light of the above circumstances, and it is an object thereof to enable assembly of an airbag module, which functions as a dynamic damper, on a steering wheel to be carried out with a smaller number of components and a smaller number of assembly steps.

Means for Solving the Problems

In order to attain the above object, according to a first aspect of the present invention, there is provided a vibration reducing structure for a steering wheel in which an airbag module is supported in an interior of the steering wheel via an elastic body so as to be capable of vibrating, thus making the airbag module function as a dynamic damper, characterized in that the elastic body is formed from a support pin itself, the support pin supporting the airbag module on a frame of the steering wheel.

Further, according to a second aspect of the present invention, in addition to the first aspect, the elastic body is formed from a part of the support pin.

Furthermore, according to a third aspect of the present invention, in addition to the second aspect, the elastic body is molded integrally with the support pin, is bonded to the support pin by adhesion, or is mechanically bonded to the support pin.

Moreover, according to a fourth aspect of the present invention, in addition to the first aspect, the elastic body is formed from an entirety of the support pin.

Further, according to a fifth aspect of the present invention, in addition to any one of the first to fourth aspects, the airbag module comprises a horn switch that moves in an axial direction of the support pin so as to close, and the support pin functions as a guide member that guides axial movement of the airbag module.

Furthermore, according to a sixth aspect of the present invention, in addition to any one of the first to fifth aspects, the frame is a core metal of the steering wheel, and the support pin provides a connection between a retainer of the airbag module and the core metal.

A core metal 15 of an embodiment corresponds to the frame of the present invention, a second retainer 22 of the embodiment corresponds to the retainer of the present invention, and a support pin 31 of the embodiment corresponds to the elastic body of the present invention.

Effects of the Invention

In accordance with the first aspect of the present invention, since the airbag module is supported in the interior of the steering wheel via the elastic body so as to be capable of vibrating, the airbag module vibrates while deforming the elastic body to thus function as a dynamic damper, thereby enabling vibration of the steering wheel to be suppressed. Since the elastic body is formed from the support pin itself, which supports the airbag module on the frame of the steering wheel, compared with a case in which a support pin and an elastic body are formed from separate members, it is possible to reduce the number of components and the number of assembly steps.

Furthermore, in accordance with the second aspect of the present invention, since part of the support pin forms the elastic body, it is possible to increase the stiffness of part of the support pin other than the elastic body, thus enhancing the assembly strength.

Moreover, in accordance with the third aspect of the present invention, since the elastic body is molded integrally with the support pin, is bonded to the support pin by adhesion, or is mechanically bonded to the support pin, it is possible to firmly bond the elastic body to the support pin.

Furthermore, in accordance with the fourth aspect of the present invention, since the entirety of the support pin forms the elastic body, the structure of the support pin becomes simple, and the production cost can be cut.

Moreover, in accordance with the fifth aspect of the present invention, since the support pin functions as the guide member for guiding axial movement of the airbag module when moving the airbag module in the axial direction of the support pin so as to close the horn switch, it becomes unnecessary to use a special guide member, thereby enabling the number of components to be further reduced.

Furthermore, in accordance with the sixth aspect of the present invention, since the frame that supports the airbag module via the support pin employs the core metal of the steering wheel, and the support pin provides a connection between the retainer of the airbag module and the core metal, the number of components can be further reduced.

EXPLANATION OF REFERENCE NUMERALS AND SYMBOLS

11 Steering wheel
15 Core metal (frame)
18 Airbag module
22 Second retainer (retainer)
31 Support pin (elastic body)
34 Elastic body
40 Horn switch Modes for Carrying Out the Invention A first embodiment of the present invention is explained below by reference to FIG. 1 to FIG. 6.

First Embodiment

Figure 1:
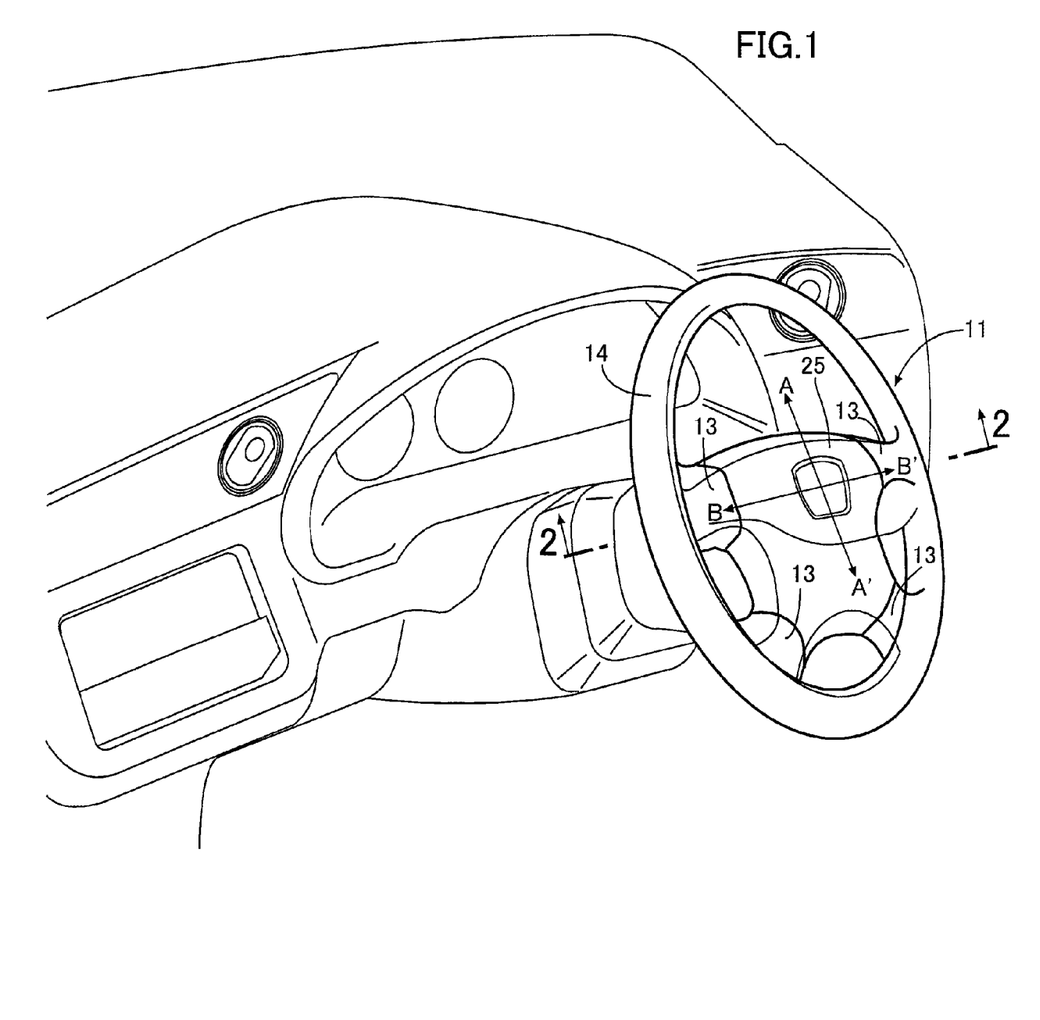
FIG. 1 is a diagram showing an inner face of a vehicle compartment of an automobile when an airbag is not deployed. (first embodiment)
Figure 2:
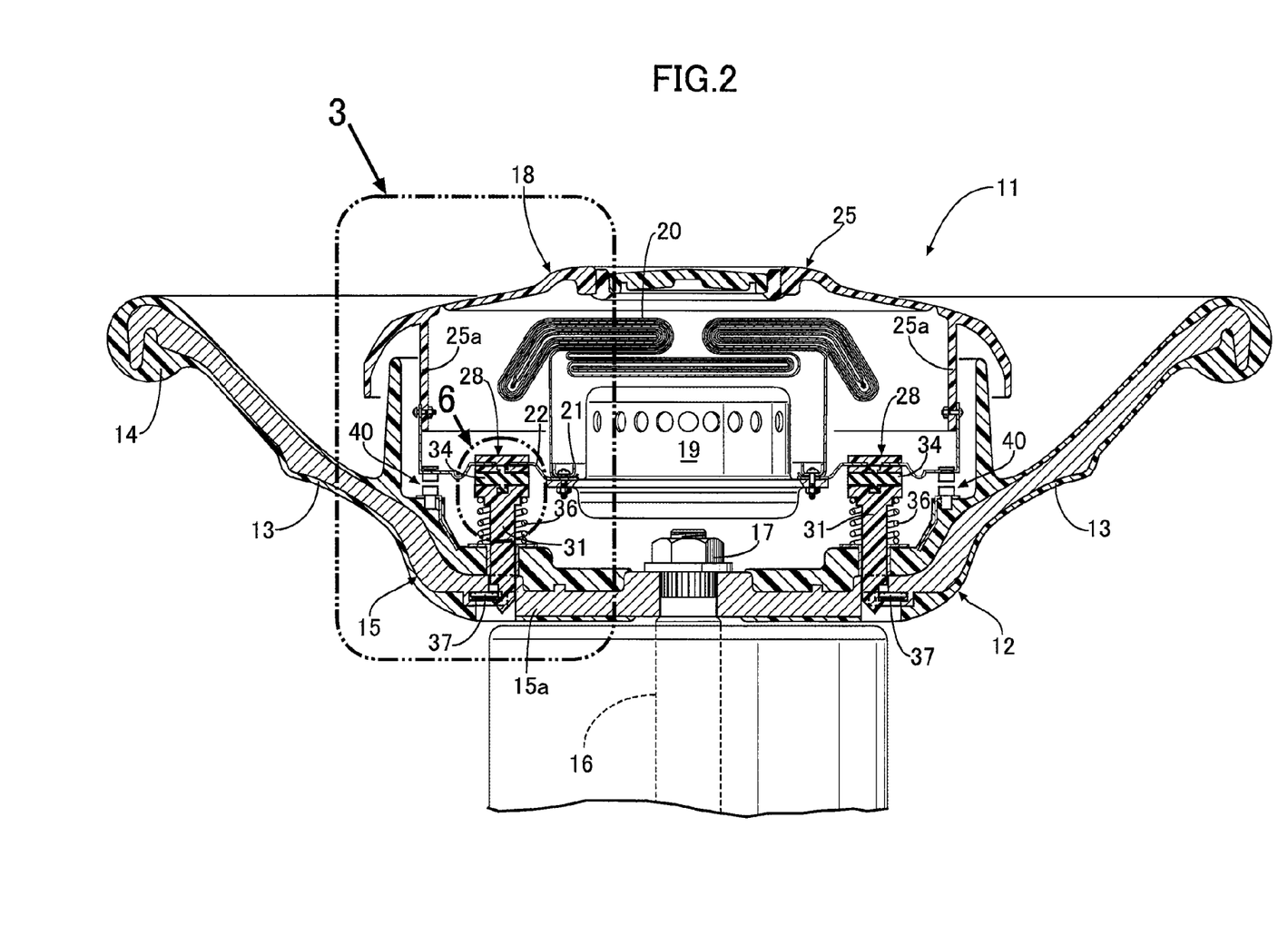
FIG. 2 is an enlarged sectional view along line 2-2 in FIG. 1. (first embodiment)

As shown in FIG. 1 and FIG. 2, a synthetic resin steering wheel 11 of an automobile includes a central cover part 12, a plurality of spoke parts 13 extending radially outwardly from the periphery of the cover part 12, and an annular rim part 14 connected to tips of the plurality of spoke parts 13, a core metal 15 being embedded in the interiors thereof. A boss portion 15a of the core metal 15 embedded in the cover part 12 is fitted onto the extremity of a steering shaft 16 and secured by means of a nut 17.

In the present specification, the axial direction is defined as being the longitudinal direction of the steering shaft 12, and the direction orthogonal to the axis is defined as being a direction that is perpendicular to the longitudinal direction of the steering shaft 12.

An airbag module 18 includes an inflator 19 that generates a high pressure gas, an airbag 20 that is disposed, in a folded state, to the rear of the inflator 19, and a first retainer 21 and a second retainer 22 that sandwich an opening part of the airbag 20. In a state in which the first retainer 21, the opening part of the airbag 20, the second retainer 22, and a flange 19a projectingly provided on the outer periphery of the inflator 19 are superimposed on one another, they are secured by means of a plurality of bolts 23 and nuts 24.

A rear face of the airbag module 18 is covered by a steering pad 25, and a linking portion 25a extending forwardly from an outer peripheral part of the steering pad 25 is fixed to an outer peripheral part of the second retainer 22 by means of bolts 26 and nuts 27. The airbag module 18 thus arranged is floatingly supported on the core metal 15 of the steering wheel 11 by means of three floating support parts 28.

Figure 3:
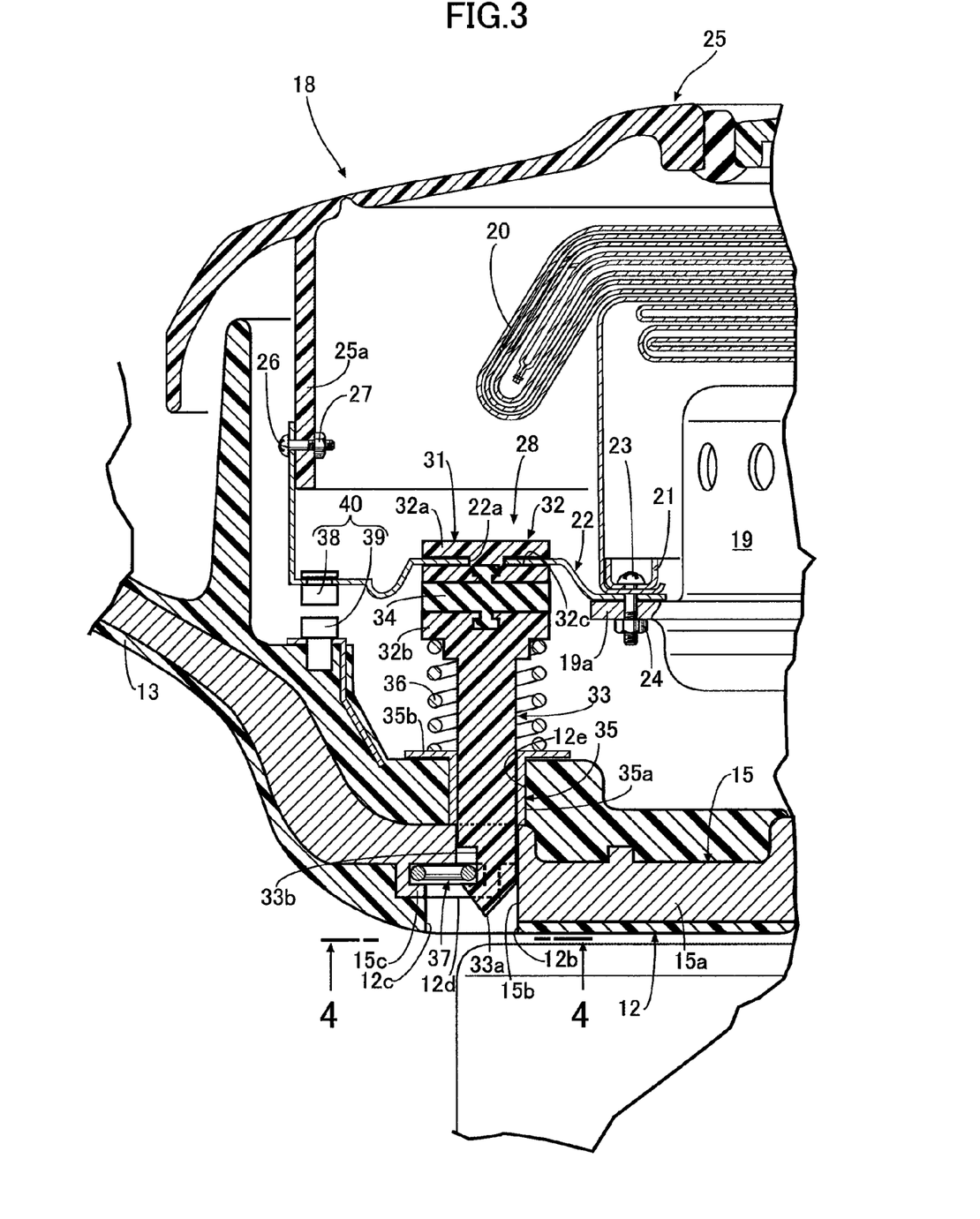
FIG. 3 is an enlarged view of part 3 in FIG. 2. (first embodiment)

As is clear from FIG. 2 and FIG. 3, the three floating support parts 28, which support the airbag module 18 on the core metal 15, are provided at two positions on left and right opposite sides of an upper part and one middle position of a lower part with the steering shaft 12 as the center, and all have the same structure. FIG. 2 shows the floating support parts 28 and 28 at the two positions on the left and right opposite sides of the upper part of the steering shaft 12.

The structure of one floating support part 28 is explained below as being representative thereof The floating support part 28 basically includes a synthetic resin support pin 31, the support pin 31 being formed from a large diameter head part 32 and a small diameter shaft part 33. The head part 32 is formed from a first portion 32a and a second portion 32b, which are formed by division into two in the axial direction, and an elastic body 34 made of a rubber such as EPDM is sandwiched between the first and second portions 32a and 32b, thus making them into a unit. An annular groove 32c formed on the first portion 32a is fitted to a mounting hole 22a of the second retainer 22, thereby implanting the support pin 31 in the second retainer 22 so as to face forward.

A support hole 12e is formed in the cover part 12, which covers the boss portion 15a of the core metal 15 of the steering wheel 11, and a tubular portion 35a of a guide bush 35 is fitted into the support hole 12e. A support hole 15b extends through the boss portion 15a of the core metal 15, the support hole 15b being coaxial with the support hole 12e of the cover part 12. The shaft part 33 of the support pin 31 is slidably fitted to an inner peripheral face of the guide bush 35 and an inner peripheral face of the support hole 15b of the boss portion 15a. A coil spring 36 is fitted around the outer periphery of the shaft part 33 of the support pin 31, one end of the coil spring 36 abutting against the second portion 32b of the head part 32 of the support pin 31, and the other end thereof abutting against a flange portion 35b of the guide bush 35.

Formed at the tip of the shaft part 33 of the support pin 31 are a tapered portion 33a, whose diameter is conically reduced, and a groove-shaped cutout 33b, which is adjacent to the tapered portion 33a. Provided on a front face of the boss portion 15a of the core metal 15 is a latching member 37, which is formed from a spring bent into a U-shape. By engaging the latching member 37 with the cutout 33b of the support pin 31 the support pin 31 is latched so that it does not escape from the guide bush 35.

Figure 4:
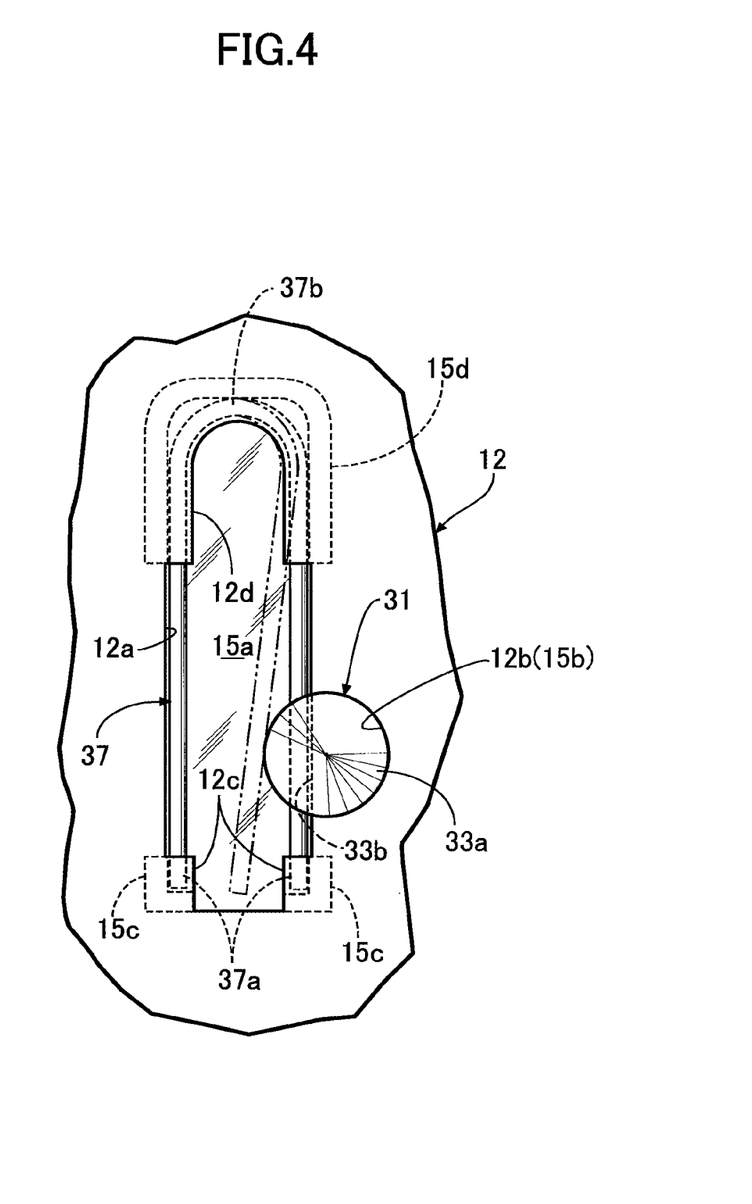
FIG. 4 is a view from arrowed line 4-4 in FIG. 3. (first embodiment)

As is clear from FIG. 3 and FIG. 4, an opening 12a is formed in the cover part 12 of the steering wheel 11, which covers the front face of the boss portion 15a of the core metal 15, so as to substantially follow the shape of the latching member 37, and this opening 12a is continuous with a semicircular opening 12b communicating with the support hole 15b of the boss portion 15a of the core metal 15. Two first protruding portions 12c and 12c protrude on one end side of the opening 12a so as to correspond to a pair of extremity portions 37a and 37a of the latching member 37, and one second protruding portion 12d protrudes on the other end side of the opening 12a so as to correspond to a bent portion 37b of the latching member 37.

On the other hand, formed on a rear face of the boss portion 15a of the core metal 15 are two first protruding portions 15c and 15c and one second protruding portion 15d. The first protruding portions 15c and 15c form a groove for retaining the pair of extremity portions 37a and 37a of the latching member 37 in cooperation with the two first protruding portions 12c and 12c of the cover part 12, and the second protruding portion 15d forms a U-shaped groove for retaining the bent portion 37b of the latching member 37 in cooperation with the second protruding portion 12d of the cover part 12. The length in the axial direction of the cutout 33b of the shaft part 33 of the support pin 31 is set so as to be larger than the diameter of the latching member 37.

A movable contact 38 is projectingly provided on the second retainer 22 in the vicinity of the floating support part 28 so as to face forward, and a fixed contact 39 is projectingly provided on the cover part 12 of the steering wheel 11 so as to face rearward, the fixed contact 39 opposing the movable contact 38 so that it can abut thereagainst. The movable contact 38 and the fixed contact 39 form a horn switch 40.

The operation of the first embodiment of the present invention having the above arrangement is now explained.

First, the procedure for mounting the airbag module 18 on the steering wheel 11 is explained. Since the opening 12a, which is shown in FIG. 4, opens on the front face of the cover part 12 of the steering wheel 11, in a state in which the two extremity portions 37a and 37a of the U-shaped latching member 37 are elastically deformed in a direction in which they approach each other, the bent portion 37b of the latching member 37 is inserted into the interior of the second protruding portion 12d of the cover part 12, the two extremity portions 37a and 37a are then positioned between the pair of first protruding portions 12c and 12c of the cover part 12, and they are then let go. As a result, the two extremity portions 37a and 37a of the latching member 37 open due to self-resilience in a direction in which they move away from each other and engage with the interiors of the pair of first protruding portions 12c and 12c of the cover part 12, thus completing mounting of the latching member 37.

Subsequently, the airbag module 18 is moved closer toward the steering wheel 11 from the rear to the front, and the shaft part 33 of the support pin 31 is inserted into the interior of the guide bush 35. Consequently, the tapered portion 33a of the shaft part 33 of the support pin 31 pushes one extremity portion 37a of the latching member 37 to thus elastically deform it into the state shown by a chain line in FIG. 4, and the extremity of the shaft part 33 is inserted into the support hole 15b of the boss portion 15a of the core metal 15. When the cutout 33b of the shaft part 33 of the support pin 31 reaches a position at which it opposes one extremity portion 37a of the latching member 37, the extremity portion 37a opens outward due to the resilient force of the support pin 31 to thus engage with the cutout 33b, and the support pin 31 is latched so that it cannot come off.

In this way, merely pushing the airbag module 18 against the steering wheel 11 enables the three support pins 31 to latch with the steering wheel 11 and be fixed by means of the latching members 37, thereby greatly decreasing the number of assembly steps.

Figure 5:
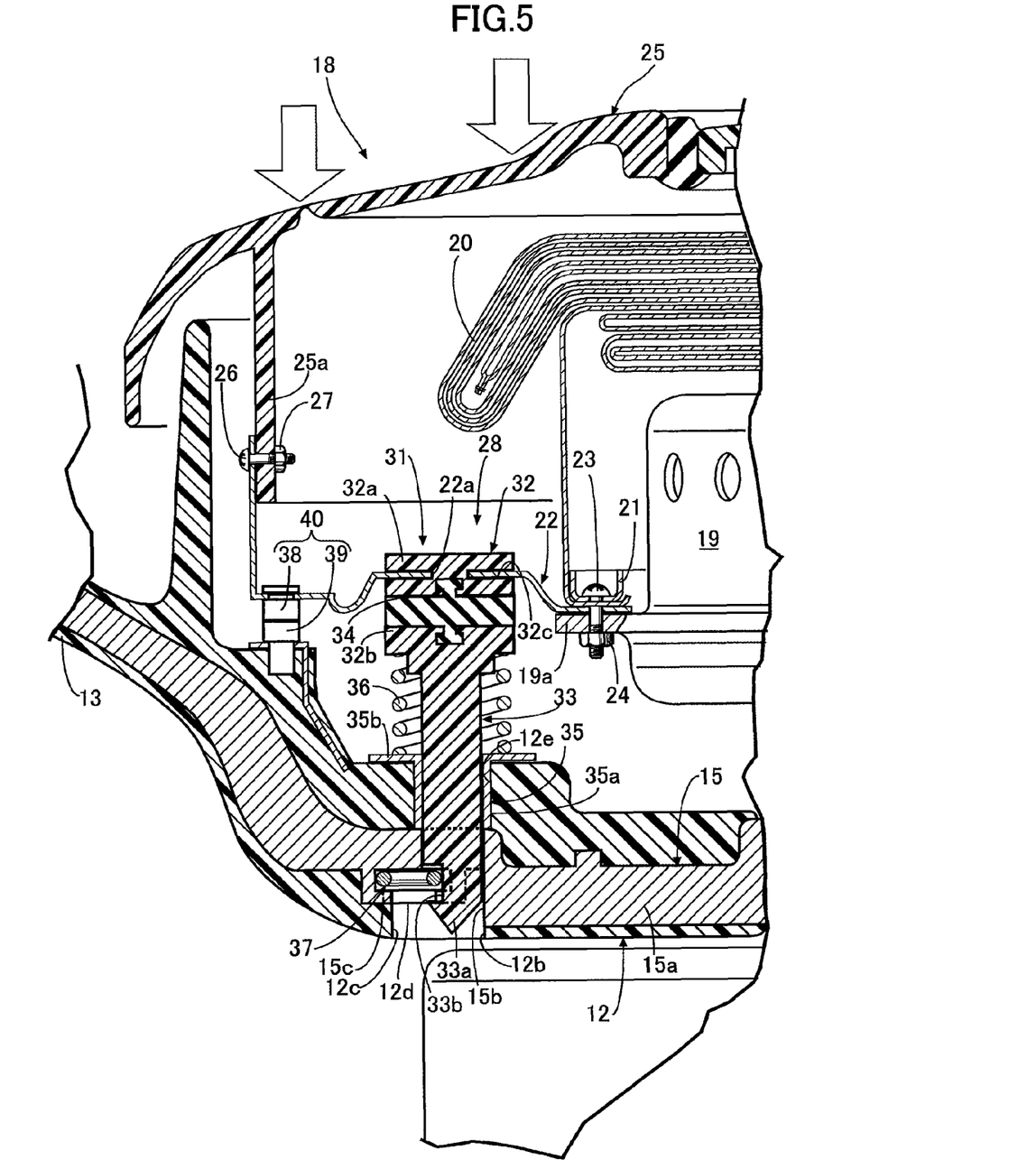
FIG. 5 is a diagram, corresponding to FIG. 3, for explaining the operation. (first embodiment)
Figure 6:
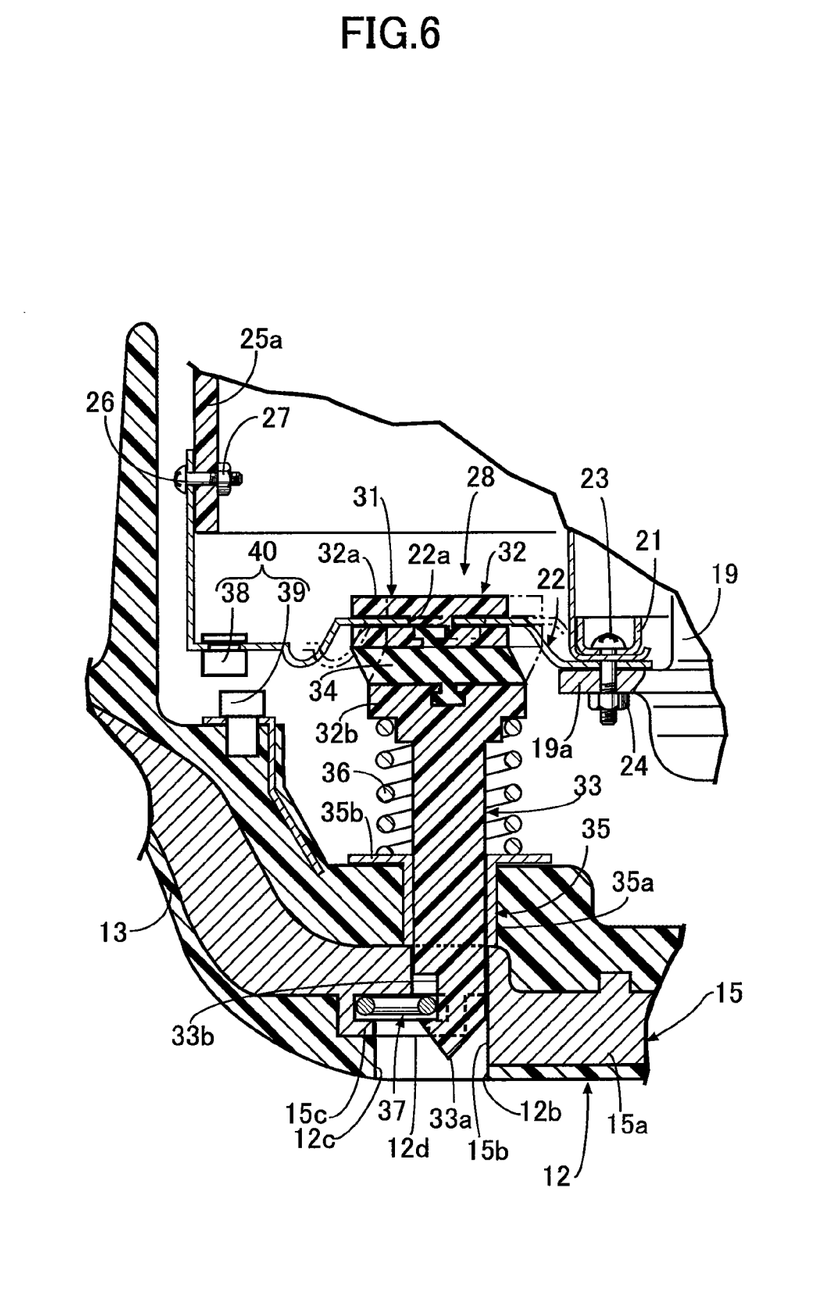
FIG. 6 is a diagram, corresponding to part 6 in FIG. 2, for explaining the operation. (first embodiment)

As shown in FIG. 5 when, in order to operate a horn, which is not illustrated, an upper right part, upper left part, or lower middle part of the steering pad 25 of the steering wheel 11 is pushed, the three support pins 31 of the three floating support parts 28 provided on the second retainer 22 of the airbag module 18 are guided via the guide bushes 35 provided on the steering wheel 11 and the support holes 15b of the core metal 15 to thus compress the coil springs 36, and the airbag module 18 moves forward relative to the steering wheel 11. In this process, since the length of the cutouts 33b of the support pins 31 is larger than the diameter of the latching members 37, the support pins 31 are allowed to move forward relative to the latching members 37 by a distance corresponding to the difference between the length of the cutouts 33b and the diameter of the latching members 37.

When the airbag module 18 moves forward in this way, the movable contact 38 provided on the airbag module 18 side and the fixed contact 39 provided on the steering wheel 11 side make contact with each other to thus close the horn switch 40, and the horn, which is not illustrated, can be connected to a battery and sounded.

If vibration from an engine or a road surface is transmitted to the steering wheel 11 via the steering shaft 16, the hands of a driver gripping the steering wheel 11 vibrate to thus generate an unpleasant sensation, and the vibration of the steering wheel 11 is therefore suppressed by means of a dynamic damper. A dynamic damper supports a mass on a vibrating body via an elastic body; in the present embodiment the airbag module 18 (of which the inflator 19 in particular, has a large weight) is made to function as the mass, and the elastic bodies 34, which form part of the support pins 31, are made to function as the elastic body of the dynamic damper. In this way, since the airbag module 18 is made to function as the mass of the dynamic damper, it becomes unnecessary to provide a special mass, which is advantageous in terms of the number of components, weight, installation space, and cost and, moreover, since the elastic bodies 34 of the dynamic damper are formed from the support pins 31 themselves, which support the airbag module 18 on the steering wheel 11, it is possible to contribute to a reduction in the number of components and the number of assembly steps.

The dynamic damper of the present embodiment reduces the vibration of the steering wheel 11 in a direction orthogonal to the axis (for example, direction A-A' or direction B-B' in FIG. 1), and its vibration damping characteristics are determined by the mass of the airbag module 18 as the mass and the spring constant of the elastic bodies 34. In this arrangement, since the coil springs 36, which floatingly support the airbag module 18 in the axial direction, do not undergo elastic deformation in a direction orthogonal to the axis, they do not contribute to the vibration damping characteristics of the dynamic damper.

Therefore, the spring constant of the coil springs 36 may be set so as to prevent erroneous operation due to vibration of the horn switches 40 formed from the movable contacts 38 and the fixed contacts 39 or to satisfy the operational feel, and the degree of freedom in the design thereof greatly increases. On the other hand, since the spring constant of the elastic bodies 34 of the present embodiment can be set while focusing only on the vibration damping characteristics of the dynamic damper, the degree of freedom in the design thereof greatly increases.

That is, since the spring constant in a direction orthogonal to the axis can be freely adjusted by changing the hardness or thickness of the elastic bodies 34, which are made of a rubber, for example, dynamic damper characteristics that reduce the vibration of the steering wheel 11 in the vertical direction (direction A-A' in FIG. 1) or dynamic damper characteristics that reduce the vibration of the steering wheel 11 in the left-and-right direction (direction B-B' in FIG. 1) can be set independently from the operating characteristics of the horn switches 40 (the spring constant of the coil springs 36), and vibration of the steering wheel 11 in a direction orthogonal to the axis can be reduced effectively.

Figure 7:
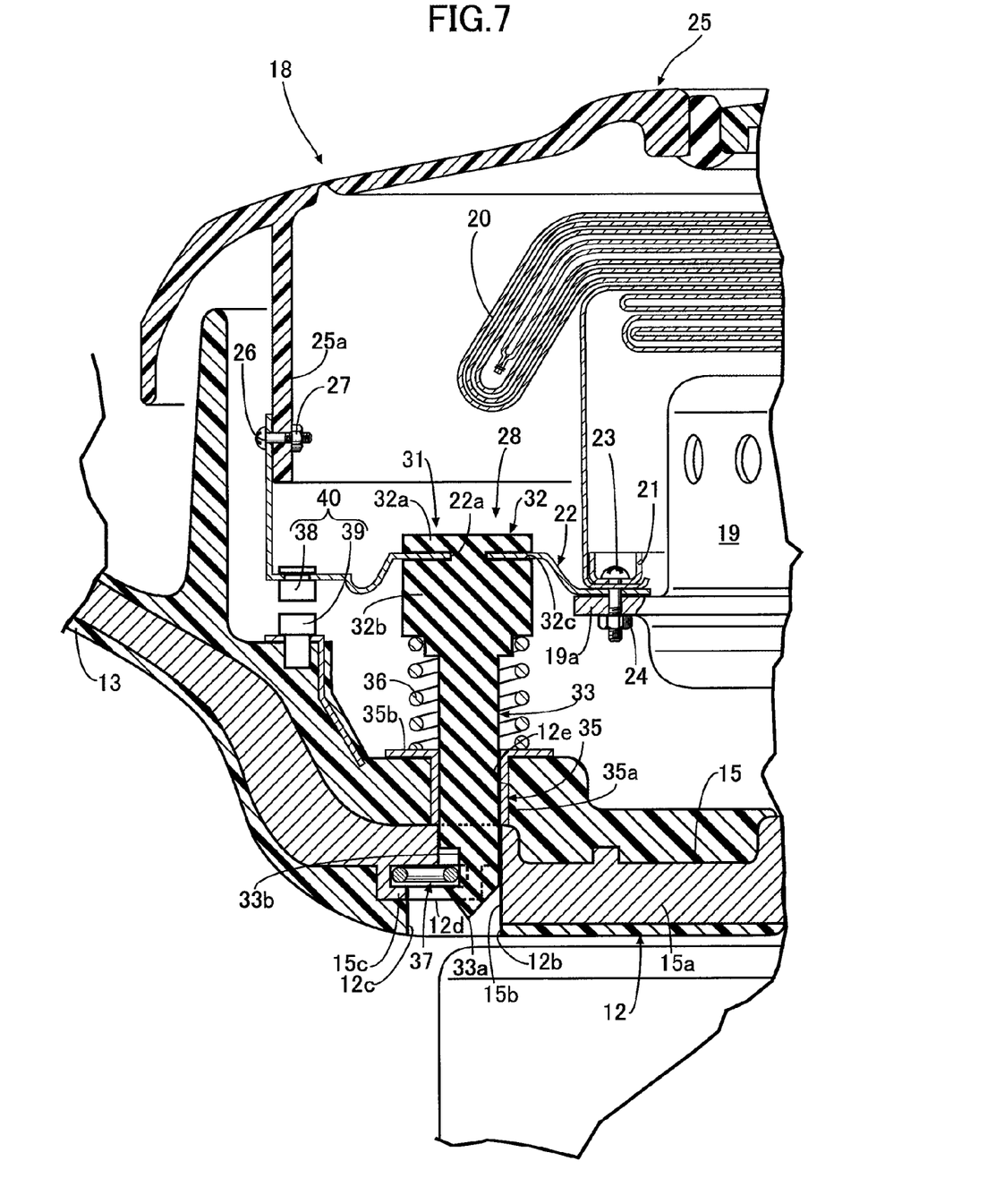
FIG. 7 is a diagram corresponding to FIG. 3. (second embodiment)

A second embodiment of the present invention is now explained by reference to FIG. 7.

Second Embodiment

In the first embodiment, part of the support pin 31 is formed as the elastic body 34, but in the second embodiment the entirety of a support pin 31 is molded integrally as an elastic body. In accordance with the first embodiment described above, since part of the support pin 31 forms the elastic body 34, it is possible to enhance the assembly strength by increasing the stiffness of part of the support pin 31 other than the elastic body 34, but in accordance with the second embodiment, since the entirety of the support pin 31 forms the elastic body 34, the structure of the support pin 31 becomes simple, and the production cost can be cut.

Embodiments of the present invention are explained above, but the present invention may be modified in a variety of ways as long as the modifications do not depart from the spirit and scope thereof.

For example, in the embodiment the support pin 31 fixed on the airbag module 18 side is slidably supported on the steering wheel 11 side, but a support pin 31 fixed on a steering wheel 11 side may be slidably supported on an airbag module 18 side.

Furthermore, the structure for latching the support pin 31 with the steering wheel 11 is not limited to the latching member 37 of the embodiment.

Moreover, in the embodiment the first and second portions 32a and 32b of the support pin 31 and the elastic body 34 are mechanically bonded (interlocked), but a support pin 31 may be inserted into a mold and injection-molded together with an elastic body 34 or first and second portions 32a and 32b of a support pin 31 and an elastic body 34 may be joined by adhesion, and first and second portions 32a and 32b of a support pin 31 and an elastic body 34 can be firmly bonded by these methods.

The invention claimed is:

1. A vibration reducing structure for a steering wheel in which an airbag module is supported in an interior of the steering wheel via a support pin so as to be capable of vibrating, wherein the support pin comprises an elastic body,
the support pin is configured to support the airbag module on a frame of the steering wheel,
the elastic body is sandwiched between a first portion and a second portion of a head portion of the support pin,
the first portion and the second portion are arranged in an axial direction of the support pin, and
the airbag module is configured to function as a dynamic damper.

2. The vibration reducing structure for a steering wheel according to claim 1, wherein the elastic body is molded integrally with the support pin, is bonded to the support pin by adhesion, or is mechanically bonded to the support pin.

3. The vibration reducing structure for a steering wheel according to claim 2, wherein the airbag module comprises a horn switch that moves in the axial direction of the support pin so as to close, and the support pin functions as a guide member that guides axial movement of the airbag module.

4. The vibration reducing structure for a steering wheel according to claim 1, wherein the airbag module comprises a horn switch that moves in the axial direction of the support pin so as to close, and the support pin functions as a guide member that guides axial movement of the airbag module.

5. The vibration reducing structure for a steering wheel according to claim 1, wherein
the frame is a core metal of the steering wheel, and
the support pin provides a connection between a retainer of the airbag module and the core metal.

6. A vibration reducing structure for a steering wheel in which an airbag module is supported in an interior of the steering wheel via a support pin so as to be capable of vibrating, wherein said support pin comprises an elastic body,
the support pin configured to support the airbag module on a frame of the steering wheel,
the airbag module comprises a horn switch that moves in an axial direction of the support pin so as to close,
the support pin functions as a guide member that guides axial movement of the airbag module, and
the airbag module is configured to function as a dynamic damper.

* * * * *